United States Patent
Colton et al.

(10) Patent No.: US 8,914,774 B1
(45) Date of Patent: Dec. 16, 2014

(54) SYSTEM AND METHOD FOR TAGGING CODE TO DETERMINE WHERE THE CODE RUNS

(75) Inventors: Paul Colton, Hillsborough, CA (US); Uri Sarid, Menlo Park, CA (US); Kevin Edward Lindsey, Benbrook, TX (US)

(73) Assignee: Appcelerator, Inc., Mountain View, CA (US)

( * ) Notice: Subject to any disclaimer, the term of this patent is extended or adjusted under 35 U.S.C. 154(b) by 1105 days.

(21) Appl. No.: 12/270,868

(22) Filed: Nov. 14, 2008

Related U.S. Application Data

(60) Provisional application No. 60/988,117, filed on Nov. 15, 2007.

(51) Int. Cl.
*G06F 9/44* (2006.01)
*G06F 17/24* (2006.01)

(52) U.S. Cl.
CPC .. *G06F 8/33* (2013.01); *G06F 8/30* (2013.01); *G06F 8/71* (2013.01); *G06F 17/24* (2013.01)
USPC .......................................... 717/110; 709/203

(58) Field of Classification Search
CPC ......... G06F 9/44; G06F 8/76; G06F 9/45529; G06F 8/33
USPC ................... 717/100–110; 709/203
See application file for complete search history.

(56) References Cited

U.S. PATENT DOCUMENTS

| | | |
|---|---|---|
| 4,989,132 A | 1/1991 | Mellender et al. |
| 5,361,351 A | 11/1994 | Lenkov et al. |
| 5,448,740 A | 9/1995 | Kiri et al. |
| 5,794,046 A | 8/1998 | Meier et al. |
| 5,812,851 A | 9/1998 | Levy et al. |
| 5,821,851 A | 10/1998 | Blackmer |
| 5,878,223 A | 3/1999 | Becker et al. |
| 6,067,413 A | 5/2000 | Gustafsson et al. |
| 6,144,962 A | 11/2000 | Weinberg et al. |
| 6,151,599 A | 11/2000 | Shrader et al. |
| 6,185,587 B1 | 2/2001 | Bernardo et al. |
| 6,192,382 B1 | 2/2001 | Lafer et al. |
| 6,240,414 B1 | 5/2001 | Beizer et al. |
| 6,324,686 B1 | 11/2001 | Komatsu et al. |
| 6,356,283 B1 | 3/2002 | Guedalia |
| 6,381,737 B1 | 4/2002 | Click, Jr. et al. |
| 6,453,335 B1 | 9/2002 | Kaufmann |
| 6,470,349 B1 | 10/2002 | Heninger et al. |
| 6,539,433 B1 | 3/2003 | Tominaga et al. |
| 6,609,246 B1 | 8/2003 | Guhr et al. |

(Continued)

OTHER PUBLICATIONS

"Yahoo et al" ;"HOWTO: Use a Web Proxy for Cross-Domain XMLHttpRequest Calls", "Mar. 16, 2006"; retreived at "https://developer.yahoo.com/javascript/howto-proxy.html"; "3 pages".*

(Continued)

*Primary Examiner* — Wei Zhen
*Assistant Examiner* — Brahim Bourzik
(74) *Attorney, Agent, or Firm* — Staniford Tomita LLP

(57) ABSTRACT

A method, system, Web-environment and computer program product for tagging to code to determine a run location. The present includes identifying a plurality of sections of a code, according to runat attributes. Each of the sections of the code is tagged with a runat attribute according to where the section of the code should run. The code can run on the client-side, the server-side or both. The invention preferably operates with a system that allows for JavaScript to be utilized on the server-side.

18 Claims, 12 Drawing Sheets

(56) References Cited

U.S. PATENT DOCUMENTS

| | | | |
|---|---|---|---|
| 6,684,369 B1 | 1/2004 | Bernardo et al. |
| 6,779,114 B1 | 8/2004 | Chow et al. |
| 6,829,746 B1 | 12/2004 | Schwerdtfeger et al. |
| 6,874,025 B2 | 3/2005 | Hoogenboom et al. |
| 6,915,454 B1 | 7/2005 | Moore et al. |
| 6,941,562 B2 | 9/2005 | Gao et al. |
| 6,981,215 B1 | 12/2005 | Lindhorst et al. |
| 6,990,653 B1* | 1/2006 | Burd et al. ............... 717/108 |
| 7,000,008 B2 | 2/2006 | Bautista-Lloyd et al. |
| 7,024,689 B2 | 4/2006 | O'Donnell et al. |
| 7,043,460 B2 | 5/2006 | Deboer et al. |
| 7,047,318 B1 | 5/2006 | Svedloff |
| 7,051,084 B1 | 5/2006 | Hayton et al. |
| 7,058,633 B1 | 6/2006 | Gnagy et al. |
| 7,062,506 B2 | 6/2006 | Taylor et al. |
| 7,086,041 B2 | 8/2006 | Plesko et al. |
| 7,103,600 B2 | 9/2006 | Mullins |
| 7,103,881 B2 | 9/2006 | Stone |
| 7,117,504 B2 | 10/2006 | Smith et al. |
| 7,124,445 B2 | 10/2006 | Cronce et al. |
| 7,139,798 B2 | 11/2006 | Zircher et al. |
| 7,143,136 B1 | 11/2006 | Drenan et al. |
| 7,167,862 B2 | 1/2007 | Mullins |
| 7,213,231 B1 | 5/2007 | Bandhole et al. |
| 7,222,336 B2 | 5/2007 | Willis |
| 7,231,644 B2 | 6/2007 | Kieffer |
| 7,269,636 B2 | 9/2007 | McCollum et al. |
| 7,284,054 B2 | 10/2007 | Radhakrishnan |
| 7,284,239 B1 | 10/2007 | Young et al. |
| 7,296,297 B2 | 11/2007 | Kirkpatrick et al. |
| 7,308,648 B1 | 12/2007 | Buchthal et al. |
| 7,313,789 B1 | 12/2007 | Yellin et al. |
| 7,333,801 B2 | 2/2008 | Chandhok |
| 7,386,786 B2 | 6/2008 | Davis et al. |
| 7,389,330 B2 | 6/2008 | Dillon et al. |
| 7,426,723 B1 | 9/2008 | Nikolov |
| 7,451,352 B1 | 11/2008 | Moore et al. |
| 7,454,526 B2 | 11/2008 | Brown et al. |
| 7,478,401 B2 | 1/2009 | Irassar et al. |
| 7,478,408 B2 | 1/2009 | Sesma |
| 7,487,201 B1 | 2/2009 | Murray et al. |
| 7,496,841 B2 | 2/2009 | Hadfield et al. |
| 7,500,223 B2 | 3/2009 | DeSantis |
| 7,506,315 B1 | 3/2009 | Kabadiyski et al. |
| 7,509,654 B2 | 3/2009 | Jennings et al. |
| 7,542,957 B2 | 6/2009 | Roy et al. |
| 7,543,267 B2* | 6/2009 | Lindhorst et al. .......... 717/105 |
| 7,543,271 B2 | 6/2009 | Gadre |
| 7,555,484 B2 | 6/2009 | Kulkarni et al. |
| 7,596,620 B1 | 9/2009 | Colton et al. |
| 7,614,052 B2 | 11/2009 | Wei |
| 7,617,491 B1 | 11/2009 | Nedderman |
| 7,653,623 B2 | 1/2010 | Kashima et al. |
| 7,657,436 B2 | 2/2010 | Elmore et al. |
| 7,685,609 B1* | 3/2010 | McLellan ............... 719/328 |
| 7,707,547 B2 | 4/2010 | Colton et al. |
| 7,716,634 B2 | 5/2010 | Ross et al. |
| 7,725,530 B2 | 5/2010 | Sah et al. |
| 7,788,341 B1 | 8/2010 | Burns |
| 7,814,410 B2 | 10/2010 | Kothari et al. |
| 7,823,009 B1 | 10/2010 | Tormasov et al. |
| 7,844,958 B2 | 11/2010 | Colton et al. |
| 7,870,221 B2 | 1/2011 | Matveief et al. |
| 7,921,353 B1 | 4/2011 | Murray |
| 7,958,232 B1 | 6/2011 | Colton et al. |
| 7,958,493 B2 | 6/2011 | Lindsey et al. |
| 2001/0025373 A1 | 9/2001 | Gebhart et al. |
| 2001/0032320 A1 | 10/2001 | Abdelnur et al. |
| 2001/0037292 A1 | 11/2001 | Vogt |
| 2001/0037359 A1 | 11/2001 | Mockett et al. |
| 2002/0007393 A1 | 1/2002 | Hamel |
| 2002/0016828 A1 | 2/2002 | Daugherty et al. |
| 2002/0023158 A1 | 2/2002 | Polizzi et al. |
| 2002/0069255 A1 | 6/2002 | Dinovo |
| 2002/0073235 A1 | 6/2002 | Chen et al. |
| 2002/0099738 A1 | 7/2002 | Grant |
| 2002/0112247 A1 | 8/2002 | Horner et al. |
| 2002/0138555 A1 | 9/2002 | Yu |
| 2002/0184363 A1 | 12/2002 | Viavant et al. |
| 2002/0199190 A1 | 12/2002 | Su |
| 2003/0005044 A1 | 1/2003 | Miller et al. |
| 2003/0025728 A1 | 2/2003 | Ebbo et al. |
| 2003/0033448 A1 | 2/2003 | Kieffer |
| 2003/0051188 A1 | 3/2003 | Patil |
| 2003/0061404 A1 | 3/2003 | Atwal et al. |
| 2003/0084431 A1 | 5/2003 | Kobayashi |
| 2003/0088687 A1 | 5/2003 | Begeja et al. |
| 2003/0105810 A1 | 6/2003 | McCrory et al. |
| 2003/0145282 A1 | 7/2003 | Thomas et al. |
| 2003/0177176 A1 | 9/2003 | Hirschfeld et al. |
| 2003/0195923 A1 | 10/2003 | Bloch et al. |
| 2003/0226110 A1 | 12/2003 | Scheering |
| 2004/0003377 A1 | 1/2004 | Di Loreto |
| 2004/0010621 A1 | 1/2004 | Afergan et al. |
| 2004/0021679 A1 | 2/2004 | Chapman et al. |
| 2004/0061713 A1 | 4/2004 | Jennings |
| 2004/0064822 A1 | 4/2004 | Noda |
| 2004/0066410 A1 | 4/2004 | Lindhorst et al. |
| 2004/0123238 A1 | 6/2004 | Hefetz et al. |
| 2004/0143823 A1 | 7/2004 | Wei |
| 2004/0158843 A1 | 8/2004 | Cloccarelli |
| 2004/0167784 A1 | 8/2004 | Travieso et al. |
| 2004/0167876 A1 | 8/2004 | Salerno et al. |
| 2004/0168162 A1 | 8/2004 | Park et al. |
| 2004/0177147 A1 | 9/2004 | Joshi |
| 2004/0177335 A1 | 9/2004 | Beisiegel et al. |
| 2004/0201618 A1 | 10/2004 | Alderson |
| 2004/0205411 A1 | 10/2004 | Hong et al. |
| 2004/0210865 A1 | 10/2004 | Shimura |
| 2004/0225633 A1 | 11/2004 | Jau |
| 2004/0236927 A1 | 11/2004 | Irie et al. |
| 2004/0250262 A1 | 12/2004 | Irassar et al. |
| 2004/0268303 A1 | 12/2004 | Abe et al. |
| 2005/0005160 A1 | 1/2005 | Bates et al. |
| 2005/0015759 A1 | 1/2005 | Zatloukal |
| 2005/0027823 A1 | 2/2005 | Rana |
| 2005/0028084 A1 | 2/2005 | Dziejma |
| 2005/0043940 A1 | 2/2005 | Elder |
| 2005/0044197 A1 | 2/2005 | Lai |
| 2005/0066319 A1 | 3/2005 | DeLine et al. |
| 2005/0069207 A1 | 3/2005 | Zakrzewski et al. |
| 2005/0086344 A1 | 4/2005 | Suesserman |
| 2005/0091576 A1 | 4/2005 | Relyea et al. |
| 2005/0091650 A1 | 4/2005 | Heeb |
| 2005/0102400 A1 | 5/2005 | Nakahara |
| 2005/0144622 A1 | 6/2005 | Ballinger et al. |
| 2005/0160415 A1 | 7/2005 | Kwon et al. |
| 2005/0172338 A1 | 8/2005 | Sandu et al. |
| 2005/0177753 A1 | 8/2005 | Carpenter |
| 2005/0182778 A1 | 8/2005 | Heuer et al. |
| 2005/0188051 A1 | 8/2005 | Sneh |
| 2005/0198202 A1* | 9/2005 | Yamamoto ............... 709/218 |
| 2005/0246391 A1 | 11/2005 | Gross |
| 2005/0256933 A1 | 11/2005 | Millington et al. |
| 2005/0278641 A1 | 12/2005 | Mansour et al. |
| 2006/0015842 A1 | 1/2006 | DeSantis |
| 2006/0047780 A1 | 3/2006 | Patnude |
| 2006/0064434 A1 | 3/2006 | Gilbert et al. |
| 2006/0075088 A1 | 4/2006 | Guo et al. |
| 2006/0080592 A1 | 4/2006 | Alves de Moura et al. |
| 2006/0123397 A1 | 6/2006 | McGuire |
| 2006/0129997 A1 | 6/2006 | Stichnoth et al. |
| 2006/0136555 A1 | 6/2006 | Patrick et al. |
| 2006/0136712 A1 | 6/2006 | Nagendra et al. |
| 2006/0149746 A1 | 7/2006 | Bansod et al. |
| 2006/0150111 A1 | 7/2006 | Farber |
| 2006/0155707 A1 | 7/2006 | Marcjan |
| 2006/0156279 A1 | 7/2006 | Nelson et al. |
| 2006/0167981 A1 | 7/2006 | Bansod et al. |
| 2006/0173998 A1 | 8/2006 | Ohara |
| 2006/0190997 A1 | 8/2006 | Mahajani et al. |
| 2006/0200491 A1 | 9/2006 | Weber |
| 2006/0200503 A1 | 9/2006 | Dosa et al. |
| 2006/0230133 A1 | 10/2006 | Snyder et al. |

(56) References Cited

U.S. PATENT DOCUMENTS

| | | | |
|---|---|---|---|
| 2006/0230149 A1 | 10/2006 | Jackson | |
| 2006/0236223 A1 | 10/2006 | Aubert et al. | |
| 2006/0253508 A1 | 11/2006 | Colton et al. | |
| 2006/0259592 A1 | 11/2006 | Angeline | |
| 2006/0277250 A1 | 12/2006 | Cherry et al. | |
| 2007/0011650 A1 | 1/2007 | Hage et al. | |
| 2007/0055964 A1 | 3/2007 | Mirkazemi et al. | |
| 2007/0061700 A1 | 3/2007 | Kothari et al. | |
| 2007/0067418 A1 | 3/2007 | Isaacs et al. | |
| 2007/0073739 A1 | 3/2007 | Jennings et al. | |
| 2007/0073806 A1 | 3/2007 | Srinivas et al. | |
| 2007/0100967 A1 | 5/2007 | Smith et al. | |
| 2007/0106946 A1* | 5/2007 | Goetz et al. | 715/744 |
| 2007/0107057 A1 | 5/2007 | Chander et al. | |
| 2007/0113188 A1 | 5/2007 | Bales et al. | |
| 2007/0124311 A1 | 5/2007 | Lee et al. | |
| 2007/0124500 A1 | 5/2007 | Bedingfield, Sr. et al. | |
| 2007/0136201 A1 | 6/2007 | Sah et al. | |
| 2007/0136477 A1 | 6/2007 | Bryce et al. | |
| 2007/0143283 A1 | 6/2007 | Spencer et al. | |
| 2007/0143672 A1 | 6/2007 | Lipton et al. | |
| 2007/0150480 A1 | 6/2007 | Hwang et al. | |
| 2007/0174419 A1 | 7/2007 | O'Connell et al. | |
| 2007/0203973 A1 | 8/2007 | Landauer et al. | |
| 2007/0214239 A1 | 9/2007 | Mechkov et al. | |
| 2007/0214261 A1 | 9/2007 | Kikuchi et al. | |
| 2007/0231781 A1 | 10/2007 | Zimmermann et al. | |
| 2007/0240032 A1 | 10/2007 | Wilson | |
| 2007/0250513 A1 | 10/2007 | Hall et al. | |
| 2007/0288858 A1 | 12/2007 | Pereira et al. | |
| 2008/0005657 A1 | 1/2008 | Sneh | |
| 2008/0010338 A1 | 1/2008 | Curtis et al. | |
| 2008/0072139 A1 | 3/2008 | Salinas et al. | |
| 2008/0077556 A1 | 3/2008 | Muriente | |
| 2008/0082965 A1 | 4/2008 | Atkin et al. | |
| 2008/0104025 A1 | 5/2008 | Dharamshi et al. | |
| 2008/0104224 A1 | 5/2008 | Litofsky et al. | |
| 2008/0109680 A1 | 5/2008 | Kodaka et al. | |
| 2008/0140786 A1 | 6/2008 | Tran | |
| 2008/0208888 A1 | 8/2008 | Mitchell | |
| 2008/0243475 A1 | 10/2008 | Everhart et al. | |
| 2008/0244586 A1 | 10/2008 | Hopp | |
| 2008/0288739 A1 | 11/2008 | Bamba et al. | |
| 2008/0294794 A1 | 11/2008 | Darugar et al. | |
| 2008/0295004 A1 | 11/2008 | Coca et al. | |
| 2008/0295164 A1 | 11/2008 | Steiner et al. | |
| 2008/0301696 A1 | 12/2008 | Tantawi et al. | |
| 2008/0307389 A1 | 12/2008 | Marchant | |
| 2009/0013255 A1 | 1/2009 | Yuschik et al. | |
| 2009/0030926 A1 | 1/2009 | Aharoni et al. | |
| 2009/0070869 A1 | 3/2009 | Fan et al. | |
| 2009/0100154 A1 | 4/2009 | Stevenson et al. | |
| 2009/0106052 A1 | 4/2009 | Moldovan | |
| 2009/0106413 A1 | 4/2009 | Salo et al. | |
| 2009/0119675 A1 | 5/2009 | Higgins et al. | |
| 2009/0172792 A1 | 7/2009 | Backhouse | |
| 2009/0210631 A1 | 8/2009 | Bosworth et al. | |
| 2009/0216910 A1 | 8/2009 | Duchesneau | |
| 2009/0282136 A1 | 11/2009 | Subramanian | |
| 2009/0287734 A1 | 11/2009 | Borders | |
| 2009/0300210 A1 | 12/2009 | Ferris | |
| 2010/0035690 A1 | 2/2010 | Blackburn et al. | |
| 2010/0036903 A1 | 2/2010 | Ahmad et al. | |
| 2010/0042670 A1 | 2/2010 | Kamalakantha et al. | |
| 2010/0064234 A1 | 3/2010 | Schreiber et al. | |
| 2010/0070566 A1 | 3/2010 | Vandewalle | |
| 2010/0174607 A1 | 7/2010 | Henkin et al. | |
| 2010/0223385 A1 | 9/2010 | Gulley et al. | |

OTHER PUBLICATIONS

Gudeman, et al., Representing Type Information Dynamically Typed Languages; 1993, acquired from http://citeseerx.ist.psu.edu/viewdoc/download?doi=10.1.1.39.4394&rep=rep1&type=pdf, pp. 1.38.

Shao, et al., A type-based computer for standard ML;ACM, 1995, pp. 116-129.

Lars Aronsson, Operation of a Large Scale, General Purpose Wiki Website, VWF Berlin, 2002, pp. 27-37.

Morfik announces Ajax IDE, Wednesday Sep. 28, 2005, ajaxian.com, pp. 1-3.

Susanne Hupfer, Li-Te Cheng, Steven Ross, John Patterson, Introducing Collaboration into an Application Development Environment, Nov. 6-10, 2004, ACM, vol. 6, Issue 3; pp. 21-24.

Server Side JavaScript Guide, Nov. 12, 1998, Netscape Communications Corp., pp. 1-4.

Niels Leenheer, rakaz, "Make your pages load faster by combining and compressing javascript and css files," Dec. 18, 2006, rakaz.nl/2006/12/make-your-pages-load-faster-by-combining-and-compressing-javascript-and-css-files.html, pp. 1-4.

Mitchell, Scott, URL Rewriting in asp.net, published Mar. 2004 at http://msdn.microsoft.com/en-us/library/ms972974.aspx.

Making JavaScript Smaller: Dojo's Compressor, downloaded from The Internet WaybackMachine http://web.archive.org/web/20061114133532/http://dojotoolkit.org/docs/compressor_system.html on Sep. 13, 2011, archived on Nov. 11, 2006.

JSMIN, The JavaScript Minifier, Douglas Crockford, www.crockford.com, Dec. 4, 2003, downloaded Sep. 13, 2011 from http://www.crockford.com/javascript/jsmin.html.

Saravanan, "LiveCycle Productivity Kit Issue", Mar. 2007, Online Discussion; [retrieved on Apr. 10, 2012]; Retrieved from Internet <URL:http://lpk.riaforge.org/index.cfm?event=page.issue&issueid=78540FD5-F12A-3F6C-35E6...>; pp. 1-11.

Steve Vinoski, "Scripting JAX-WS," IEEE Internet Computing, May & Jun. 2006, pp. 91-94.

Na Kika: Secure Service Execution and Composition in an Open Edge-Side Computing Network; Robert Grimm, Guy Lichtman, Nikolaos Michalakis, Amos Elliston, Adam Kravetz, Jonathan Miler, and Sajid Raza; NSDI '06: 3rd Symposium on Networked Systems Design & Implementation; 2006.

Remixing the Web: Tailoring Applications using Programmable Proxies inside Web Browsers; Leslie Wu, Joel Brandt, Scott Klemmer; Stanford Technical Report; Oct. 3, 2007.

TrickyScripter,by Val Polyakh 2006, archived by the Internet WayBack Machine, Nov. 2006, http://web.archive.org/web/20061113030853/http://trickyscripter.com/ http://web.archive.org/web/20061113030904/http://trickyscripter.com/FAQ/,downloaded Jun. 22, 2012.

"Free JavaScript Optimizer", by Xtreeme, http://web.archive.org/web/20071114185001/http://www.xtreeme.com/javascript-optimizer/archived by the Internet WayBack Machine Nov. 14, 2007, downloaded Jun. 22, 2012.

Kersten, Mik; Murphy, Gail C; 1999, ACM, "Atlas: A Case Study in Building a Web-Based Learning Environment Using Aspect-Oriented Programming".

Non-Final Office Action mailed May 28, 2009 from U.S. Appl. No. 11/735,428.

Final Office Action mailed Jan. 11, 2010 from U.S. Appl. No. 11/735,428.

Non-Final Office Action mailed Jun. 23, 2010 from U.S. Appl. No. 11/735,428.

Final Office Action mailed Jan. 4, 2011 from U.S. Appl. No. 11/735,428.

Non-Final Office Action mailed May 4, 2011 from U.S. Appl. No. 12/270,817.

Final Office Action mailed Jan. 17, 2012 from U.S. Appl. No. 12/270,817.

Non-Final Office Action mailed Sep. 11, 2012 from U.S. Appl. No. 12/270,817.

Non-Final Office Action mailed Oct. 11, 2012 from U.S. Appl. No. 12/955,881.

Non-Final Office Action mailed Sep. 20, 2012 from U.S. Appl. No. 13/175,570.

Non-Final Office Action mailed Apr. 11, 2012 from U.S. Appl. No. 12/273,539.

Final Office Action mailed Oct. 19, 2012 from U.S. Appl. No. 12/273,539.

(56) References Cited

OTHER PUBLICATIONS

Non-Final Office Action mailed Sep. 8, 2010 from U.S. Appl. No. 12/275,182.
Final Office Action mailed Jan. 24, 2011 from U.S. Appl. No. 12/275,182.
Non-Final Office Action mailed Aug. 24, 2012 from U.S. Appl. No. 12/275,213.
Final Office Action mailed Oct. 5, 2011 from U.S. Appl. No. 12/275,213.
Non-Final Office Action mailed Oct. 6, 2010 from U.S. Appl. No. 12/276,327.
Final Office Action mailed Apr. 4, 2011 from U.S. Appl. No. 12/276,327.
Non-Final Office Action mailed Sep. 13, 2012 from U.S. Appl. No. 12/276,336.
Non-Final Office Action mailed Jul. 20, 2010 from U.S. Appl. No. 12/276,337.
Final Office Action mailed Feb. 22, 2011 from U.S. Appl. No. 12/276,337.
Non-Final Office Action mailed May 4, 2012 from U.S. Appl. No. 12/325,239.
Final Office Action mailed Sep. 25, 2012 from U.S. Appl. No. 12/325,239.
Non-Final Office Action mailed Feb. 2, 2011 from U.S. Appl. No. 12/325,240.
Final Office Action mailed Nov. 8, 2011 from U.S. Appl. No. 12/325,240.
Non-Final Office Action mailed Oct. 24, 2012 from U.S. Appl. No. 12/325,240.
Non-Final Office Action mailed Jan. 20, 2011 from U.S. Appl. No. 12/325,268.
Non-Final Office Action mailed Oct. 17, 2011 from U.S. Appl. No. 12/325,268.
Final Office Action mailed Aug. 24, 2012 from U.S. Appl. No. 12/325,268.
Non-Final Office Action mailed Jul. 3, 2012 from U.S. Appl. No. 12/326,103.
Non-Final Office Action mailed Feb. 1, 2011 from U.S. Appl. No. 12/326,110.
Final Office Action mailed Nov. 23, 2011 from U.S. Appl. No. 12/326,110.
Non-Final Office Action mailed Oct. 22, 2012 from U.S. Appl. No. 12/326,110.
Non-Final Office Action mailed Oct. 4, 2011 from U.S. Appl. No. 12/326,861.
Final Office Action mailed Jul. 5, 2012 from U.S. Appl. No. 12/326,861.
Non-Final Office Action mailed Aug. 9, 2011 from U.S. Appl. No. 12/326,891.
Final Office Action mailed Mar. 27, 2012 from U.S. Appl. No. 12/326,891.
Non-Final Office Action mailed Sep. 29, 2011 from U.S. Appl. No. 12/326,910.
Final Office Action mailed Jun. 19, 2012 from U.S. Appl. No. 12/326,910.
Non-Final Office Action mailed Apr. 26, 2011 from U.S. Appl. No. 12/327,330.
Final Office Action mailed Feb. 26, 2012 from U.S. Appl. No. 12/327,330.
Non-Final Office Action mailed Sep. 26, 2012 from U.S. Appl. No. 12/327,330.
Non-Final Office Action mailed Aug. 20, 2010 from U.S. Appl. No. 12/327,802.
Non-Final Office Action mailed Sep. 9, 2010 from U.S. Appl. No. 12/334,434.
Final Office Action mailed Jan. 28, 2011 from U.S. Appl. No. 12/334,434.
Non-Final Office Action mailed Oct. 5, 2011 from U.S. Appl. No. 12/563,159.
Final Office Action mailed Aug. 17, 2012 from U.S. Appl. No. 12/563,159.
Written Opinion of the International Searching Authority for PCT Application No. PCT/US07/01697, mailed Feb. 5, 2008.
Written Opinion of the International Searching Authority for PCT Application No. PCT/US07/66673, mailed Jul. 7, 2008.

\* cited by examiner

Tasks To Do

Any Changes should be automatically saved to your database

New    | Take out the trash |    | Add |

☐ | Book tickets |

☐ | Buy Milk |

☐ | This is another task |

☐ | This is a task |

SYSTEM AND METHOD FOR TAGGING CODE TO DETERMINE WHERE THE CODE RUNS

CROSS REFERENCE TO RELATED APPLICATION

This Application claims priority to U.S. Provisional Patent Application No. 60/988,117, filed on Nov. 15, 2008, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to development of Web sites and applications. More specifically, the present invention relates to facilitated Internet communications between a client-side and a server-side.

2. Description of the Related Art

Prior to Rich Internet Applications, traditional Web applications involved a client-server architecture with all of the processing on the server side and the client-side used to display the HTML web-pages served by the server. Each time a user desired to view a new Web-page, a HTTP request was sent to the server and the requested Web-page was served to the Web browser on the client-side. Such a traditional system is shown in FIG. 1 with a Web-server 1000 on a server side receiving requests over the Internet 1005 from a Web-browser 1003 on a client-side.

Rich Internet Applications, such as Ajax, greatly improved on the traditional client-server architecture by allowing the client machine to dynamically render and partially refresh web pages based on an initial set of instructions from the server, user input, and small amounts of subsequent data dynamically requested from the server. As shown in FIG. 2, the client machine processes Ajax instructions to render a Web page for the user.

Early Web applications allowed a user's browser to send a request to a server. The server processed the request and responded to the browser with a Web page. When the user wanted to view a new page, another request was sent to the server and the server responded to the browser with a new Web page. Such a process resulted in a waste of bandwidth since much of the Web contents in the first Web page were also contained in the second web page. The need to resend the same information led to a much slower user interface of a Web application than that of a native application.

An emerging technology, called Ajax (Asynchronous and JavaScript XML), was developed for refreshing part of a page instead of refreshing the whole page on every interaction between the user and application. In an Ajax application, when a user submits a form in a page, a script program, usually a JavaScript program, resident on the Web browser receives the user's request and sends a XML (Extended Markup Language) HTTP (Hyper Text Transfer Protocol) request to the Web server in background so as to retrieve only the needed Web contents instead of the whole page and perform corresponding processing to partly refresh the page when receiving a response from the Web server. In this way, the application response time is shortened, because the amount of data exchanged between the Web browser and the Web server is greatly reduced. And the processing time of the Web server is saved because much of the processing is performed at the client side.

General definitions for terms utilized in the pertinent art are set forth below.

Ajax is the use of dynamic HTML, JavaScript and CSS to create dynamic and usually interactive Web sites and applications. A more detailed explanation of Ajax is set forth in Edmond Woychowsky, *AJAX, Creating Web Pages with Asynchronous JavaScript and XML*, Prentice Hall, 2007, which is hereby incorporated by reference in its entirety.

Applets or Java Applets are mini-executable programs named with the .class suffix and are placed on a Web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

An Attribute provides additional information about an element, object or file. In a Document Object Model, an attribute, or attribute node, is contained within an element node.

Behavioral layer is the top layer and is the scripting and programming that adds interactivity and dynamic effects to a site.

Binding in a general sense is the linking of a library to an application program usually to prevent repetition of frequently utilized code.

Cascading Style Sheets (CSS) is a W3C standard for defining the presentation of Web documents.

Compiler is a computer program that translates a series of instructions written in one computer language into a resulting output in a different computer language.

Document Object Model (DOM) Element is an object contained in a Document Object Model (DOM). The term DOM is generally used to refer to the particular DOM held in the memory region being used by the Web browser. Such a DOM controls the Graphical Respondent Interface (GRI) or Graphical User Interface (GUI). The DOM is generated according to the information that the Web browser reads from the HTML file, and/or from direct JavaScript software instructions. Generally, there exists a unique DOM element for every unique HTML element. DOM elements are sometimes referred to as HTML/DOM elements, because the DOM element exists only because HTML code that was read by the Web browser listed some HTML element that had not previously existed, and thereby caused the Web browser to create that DOM element. Often specific elements of the greater set of HTML/DOM elements are identified by specifying an HTML/DOM checkbox element, or an HTML/DOM text input element. A more detailed explanation of the document object model is set forth in Jeremy Keith, *DOM Scripting, Web Design with JavaScript and the Document Object Model*, friends of, 2005, which is hereby incorporated by reference in its entirety.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid JavaScript syntax for reconstituting an object at the other end of the transmission protocol.

MySQL is a relational database management system which relies on SQL for processing data in a database.

Parser is a component of a compiler that analyzes a sequence of tokens to determine its grammatical structure with respect to a given formal grammer. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support Internet access and in particular the operation of interactive forms.

Presentation layer follows the structural layer, and provides instructions on how the document should look on the screen, sound when read aloud or be formatted when it is printed.

Rendering engine is software used with a Web browser that takes Web content (HTML, XML, image files) and formatting information (CSS, XSL) and displays the formatted content on a screen.

Serialization places an object in a binary form for transmission across a network such as the Internet and deserialization involves extracting a data structure from a series of bytes.

SQL (Structured Query Language) is a computer language designed for data retrieval and data management in a database.

Structural layer of a Web page is the marked up document and foundation on which other layers may be applied.

User is a client computer, generally operated by a human being, but in some system contexts running an automated process not under full-time human control.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

There are three types of JavaScript: 1) Client-side JavaScript; 2) Server-side JavaScript; and 3) Core JavaScript. Client-side JavaScript is generally an extended version of JavaScript that enables the enhancement and manipulation of web pages and client browsers. Server-side JavaScript is an extended version of JavaScript that enables back-end access to databases, file systems, and servers. Core JavaScript is the base JavaScript.

Core JavaScript includes the following objects: array, date, math, number and string. Client-side JavaScript and Server-side JavaScript have additional objects and functions that are specific to client-side or server-side functionality. Generally, any JavaScript libraries (.js files) created in core JavaScript can be used on both the client and the server without changes. Client-side JavaScript is composed of a Core JavaScript and additional objects such as: document, form, frame and window. The objects in Client-side JavaScript enable manipulation of HTML documents (checking form fields, submitting forms, creating dynamic pages) and the browser (directing the browser to load other HTML pages, display messages). Server-side JavaScript is composed of Core JavaScript and additional objects and functions for accessing databases and file systems, and sending email. Server-side JavaScript enables Web developers to efficiently create database-driven web applications. Server-side JavaScript is generally used to create and customize server-based applications by scripting the interaction between objects. Client-side JavaScript may be served by any server but only displayed by JavaScript-enabled browsers. Server-side JavaScript must be served by a JavaScript-enabled server but can be displayed by any browser.

United States Patent Application Publication Number 20010037359 describes a system and method for a server-side browser including markup language graphical user interface, dynamic markup language rewriter engine and profile engine. The system includes a user computer and a destination server computer separated by a server computer hosting a server-side browser (SSB). The SSB includes a markup language graphical user interface (MLGUI), a dynamic markup language rewriter engine (DMLRE) and a profiling engine (PE). The SSB may be configured as an intermediary infrastructure residing on the Internet providing customized information gathering for a user. The components of the SSB allow for controlling, brokering and distributing information more perfectly by controlling both browser functionality (on the client-side) and server functionality (on the destination site side) within a single point and without the necessity of incremental consents or integration of either side.

However, current technologies that operate Server-side JavaScript fail to offer complete interactions which are the hallmark of rich web sites and applications. When writing software, it is often convenient to group the code according to the area of functionality it provides. But the group might span code that needs to run on the server, code that needs to run on the client, code that needs to run on both, or run on the server and get stored there and have a proxy for it created on the client, etc.

BRIEF SUMMARY OF THE INVENTION

The Present Invention overcomes the obstacles of the prior art. With the present invention, one can tag a code in a variety of ways to designate its run-related behavior. For example, one can designate an entire script block with a "runat" attribute, which then applies to the code in that script block; one can programmatically set "runat" attributes on code, such as functions and objects, to control behavior at a finer granularity; and one can add annotations via JavaScript comments to set the "runat" attributes without changing the JavaScript or HTML syntactically. Additionally, one can use the JavaScript language itself to annotate the functions to define their "runat" characteristics.

One aspect of the present invention is a method for tagging to code to determine a run location. The method includes writing a code for a web application. The method also includes identifying a plurality of sections of the code according to runat attributes. The method also includes tagging each of the plurality of sections of the code with a runat attribute.

Another aspect of the present invention is a system for tagging code to determine a run location. The system includes a server, a client, a code written in a scripting language, with the code having a plurality of sections identified according to runat attributes, and means for tagging each of the plurality of sections of the code with a runat attribute.

Yet another aspect of the present invention is a web environment for tagging code to determine a run location. The web environment includes a server, a client, a code written in a scripting language, with the code having a plurality of sections identified according to runat attributes, and means for tagging each of the plurality of sections of the code with a runat attribute.

Yet another aspect of the present invention is a method for tagging to code to determine a run location. The method includes writing a code for a web application. The method also includes identifying a plurality of sections of the code according to runat attributes. The method also includes grouping the code according to an area of functionality. The method also includes tagging each of the plurality of sections of the code with a runat attribute.

Yet another aspect of the present invention is a computer program product for creating a Web application. The computer program product comprises a code written in a scripting language, with the code having a plurality of sections identified according to runat attributes, and means for tagging each of the plurality of sections of the code with a runat attribute.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 6 is a Web-page generated by the code.

DETAILED DESCRIPTION OF THE INVENTION

Figure 1:
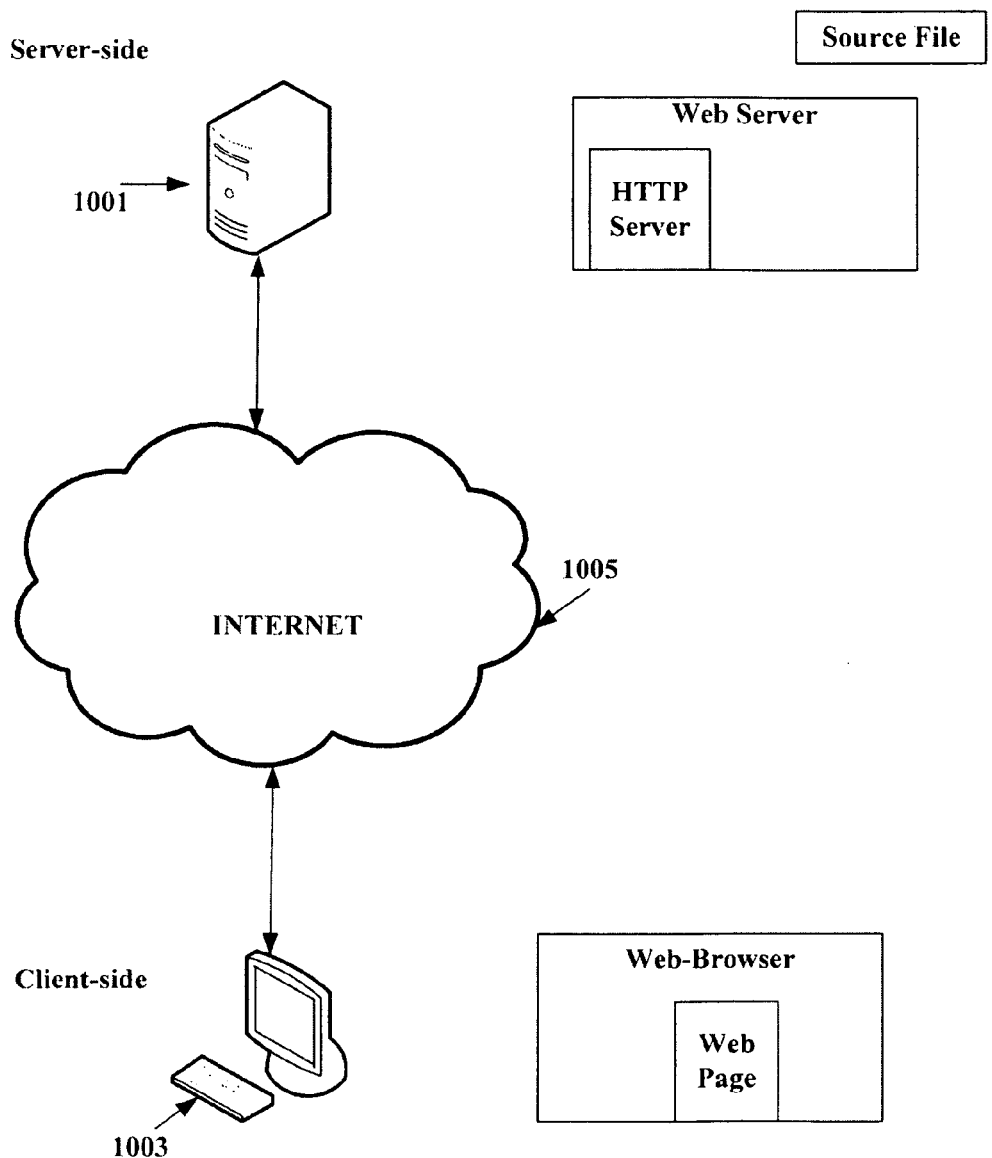
FIG. 1 is a block diagram of a web system of the prior art.
Figure 2:
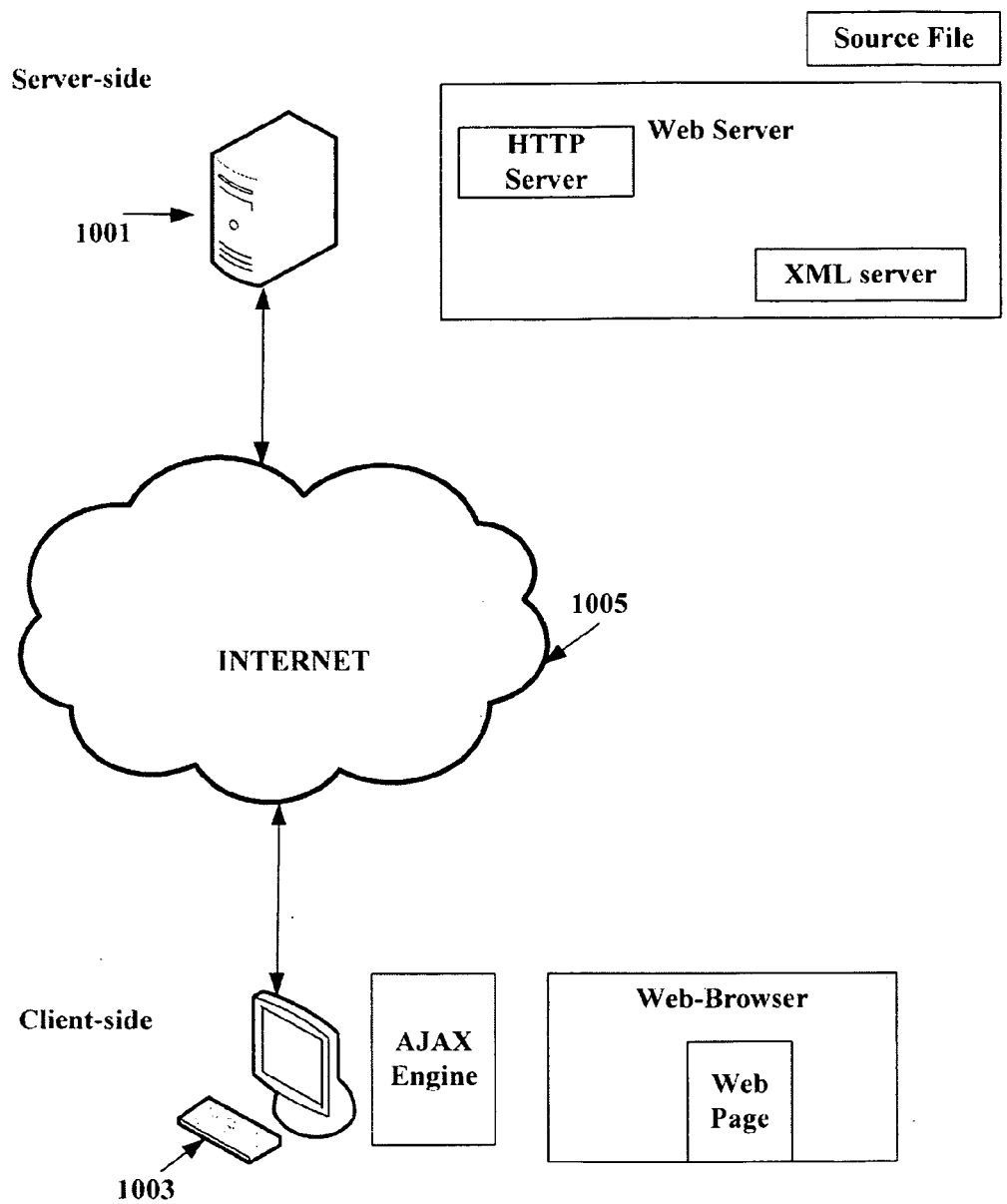
FIG. 2 is a block diagram of a web system of the prior art.
Figure 3:
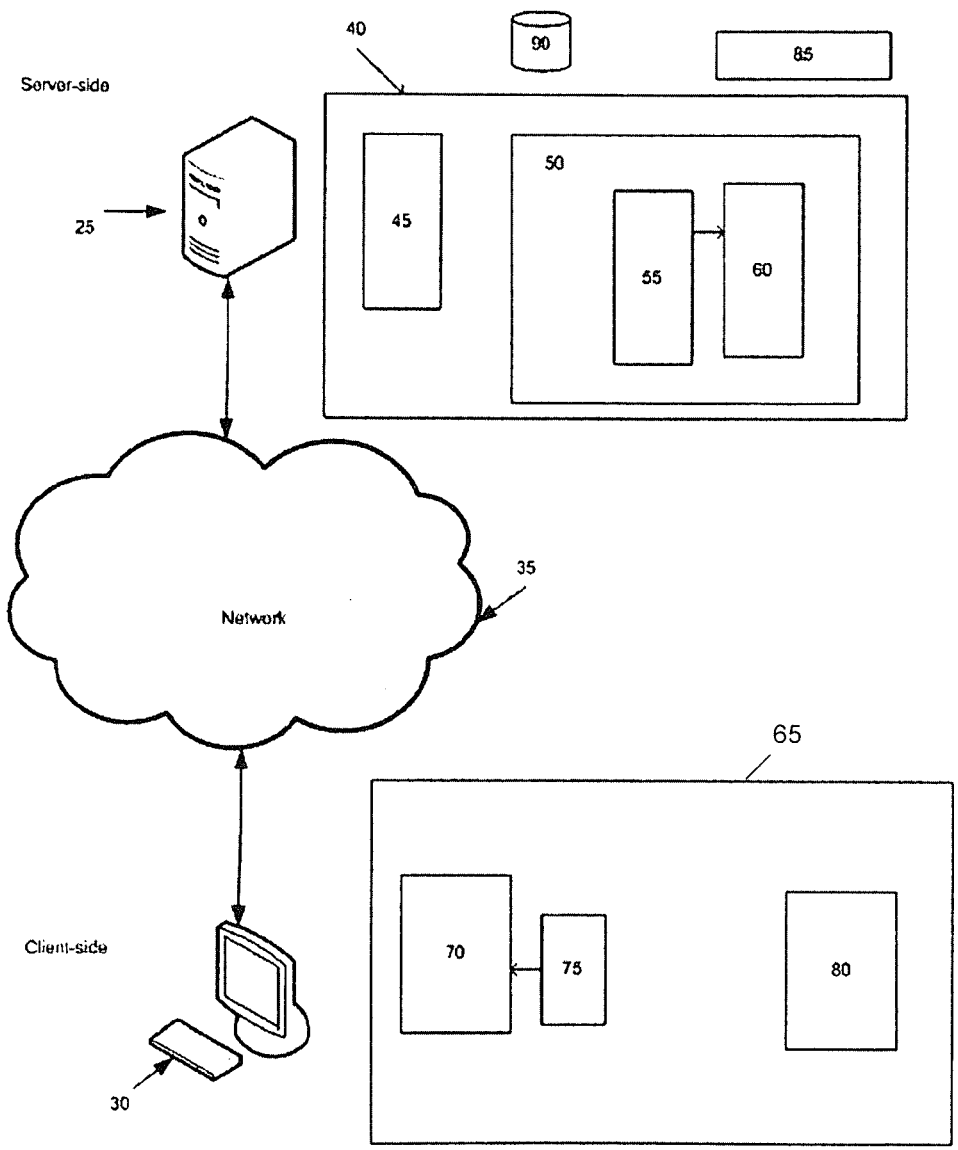
FIG. 3 is a block diagram of the system of the present invention during a callback.

As shown in FIG. 3 a system 20 of the invention generally includes a server-side 25, a client side 30 and a network or preferably the Internet 35. The server-side 25 includes a web-server 40, a handler 45 and a JavaScript server 50 preferably having a server-core 55 and a server-framework 60. The client-side 30 includes a Web-browser 65 has a client-framework 70, a client-side JavaScript code 75 and a rendering engine 80. The server-framework 60 accesses filesystems 85 and databases 90, as well as the Internet 35. A more detailed description of the abilities of the running JavaScript on the server-side and client-side is disclosed in U.S. patent application Ser. No. 12/270,817, filed Nov. 13, 2008 for *A Web Server Based On The Same Paradigms As Web-Clients*, which is hereby incorporated by reference in its entirety.

In FIG. 3, the system 20 is shown during a callback operation. The callback begins at the client-side JavaScript code 75 with a callback request sent to the client-framework 70. A HTTP GET/request is transmitted over the Internet 35 to the server-side 25, and received at the Web-server 40. The HTTP GET/request is sent to the server-core 55 which sends the HTTP GET/request as a callback to the server-framework 60. The server-framework 60 receives the callback, deserializes, performs the get functions, invokes, serializes and sends the response to the callback to the server-core 55. The server-core 55 sends the response to the Web-server 40 which sends the response over the Internet 35 to client-framework 70 on the Web-browser 65.

Figure 4:
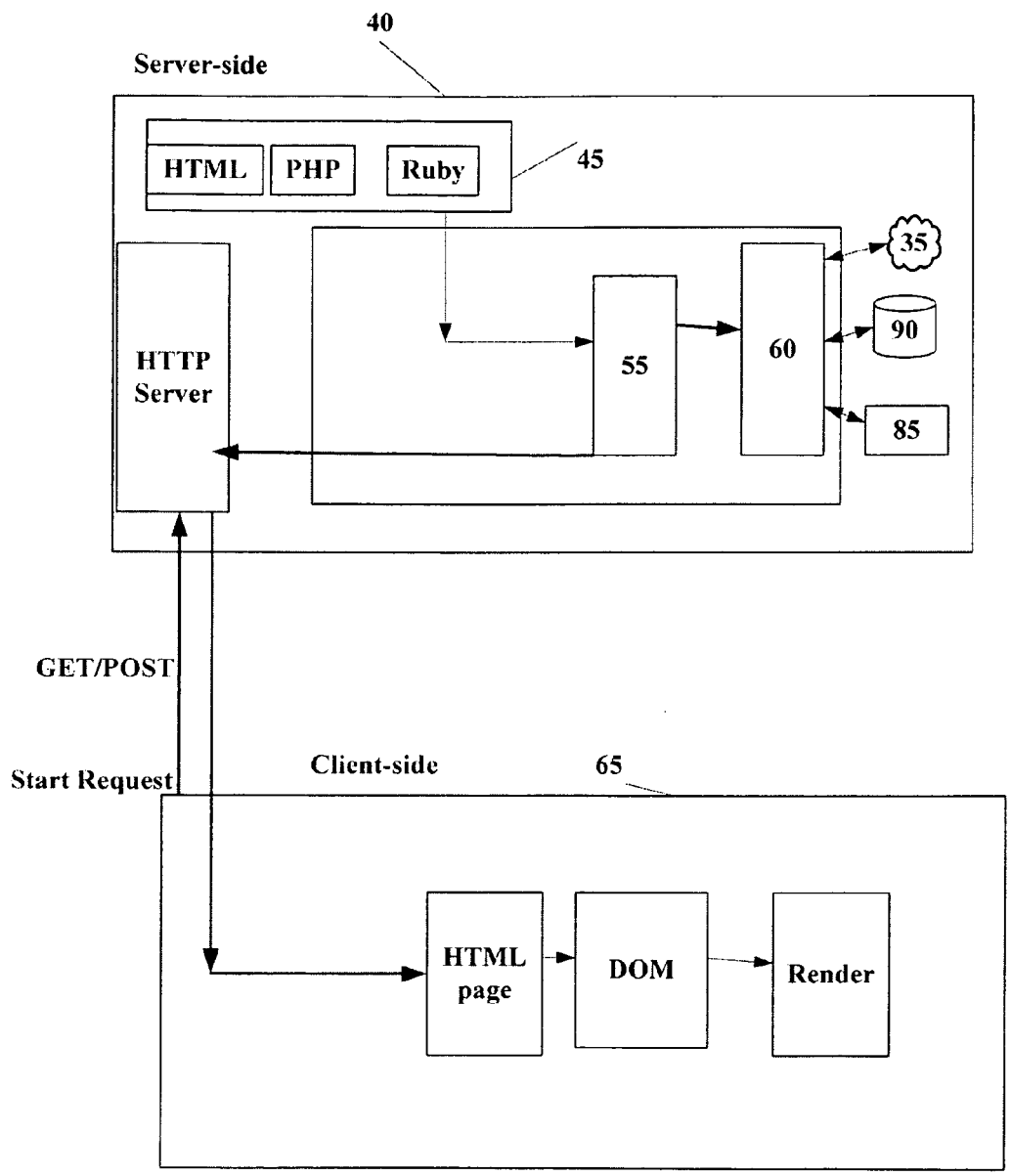
FIG. 4 is a block diagram of the system of the present invention during a normal process.

In FIG. 4, the system 20 is shown during a normal process. The process begins with a HTTP GET/request for a Web-page sent over the Internet 35 from the Web-browser 65 on the client-side 30 to the server-side 25. The HTTP Request is sent to the handler server 45. The HTML web-page is then sent to the server architecture 50. The server-core 55 of the server architecture 50 parses the HTML Web-page to create a HTML DOM of the HTML Web-page. The server-core 55 also parses and interprets the JavaScript of the HTML Web-page. The server-framework 60 accesses databases 90 and filesystems 85 to respond to the Requests for the HTML Web-page. The server-framework 60 also injects proxies to modify the HTML Web-page. The server-core 55 serializes the DOM back to the HTML Web-page and the web-server 40 transmits the HTML Web-page to the client-side 30 where the Web-browser 65 renders the HTML Web-page for display for a user.

Figure 5:
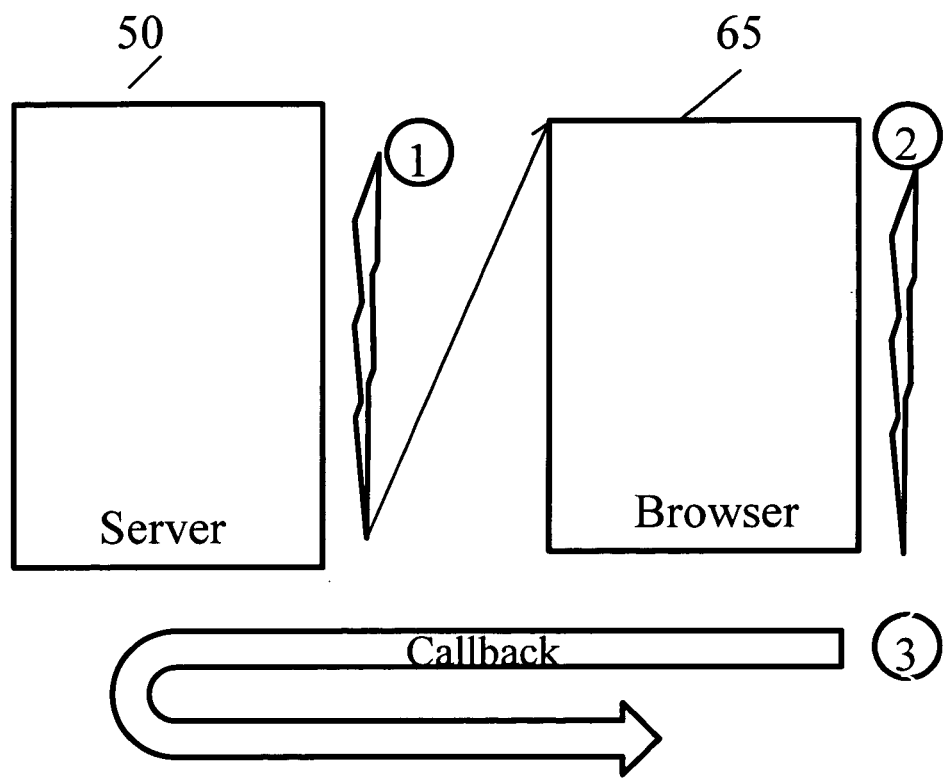
FIG. 5 is a block diagram of a callback process.

As shown in FIG. 5, the present invention allows the server 50 to execute the JavaScript functions that are set to runat="server" or runat="both". These functions might call databases, file systems, communicate across network sockets, or get session data. And since the server-side engine has a HTML DOM just like the browser, the HTML page can be manipulated through standard DOM APIs and your favorite Ajax libraries. The present invention also has session objects that can be used to persist data for users during a session or transaction. Any functions set to runat="server" are stripped from what gets sent to the browser 65. Specifically at 1, the page executes on the server 50 and a resulting HTML page is sent to the browser 65.

After server 50 sends the resulting HTML page to the browser 65, at 2 the browser 65 interprets the HTML page and executes the JavaScript within the HTML page. If JavaScript functions tagged to runat="server-proxy" are included, then the present invention automatically strips out the bodies of those functions and replaces the bodies with a new functions by the same name that know how to invoke the original function on the server 50 using Ajax calls and return the result either synchronously or asynchronously. Ajax communications do not need to be written using the present invention. Any functions not tagged with a runat attribute or set to runat="client" or runat="both" are processed by the browser 65.

Any functions set to runat="server-proxy" can now be called from the browser 65. The function is called as if it were running on the browser 65, and the present invention, automatically via XHR communications with the server 50, marshals the parameters to the server 50 where the function executes (calling databases, getting info from the session data, etc. . . . ) and returns the result to the browser 65. The "server-proxy" functions can be invoked either synchronously or asynchronously. At 3, the browser 65 calls the server 50 asynchronously for new information.

The server computer program of the present invention is pre-configured for preferable use as a plug-in to the APACHE 2.x web server. To provide standards-compliant JavaScript and DOM capabilities server-side, the server computer program is built on the MOZILLA engine, which is the same engine used in the popular FIREFOX browser. The server computer program of the present invention is layered into APACHE as an input and output filter for use to modify dynamic pages created by other languages, such as PHP or Ruby.

The server computer program of the present invention is preferably a combination of C/C++ "Core" code and a server-side JavaScript "Framework." The server-core 55 provides the JavaScript parser and runtime, HTML parser and DOM engine, and an event architecture that calls the server-framework 60 as the On the server side 25, a developer's JavaScript environment is enhanced by the server-framework 60, which provides access to the database (e.g., MySQL), file system, network, the HTTP Request and Response data, and the external server-side platforms such as Java, PHP, and Ruby.

An example of code written by a developer and prior to processing by the present invention is set forth below.

```
<html>
    <head>
        <title>Tasks</title>
        <style>
            body { font: 9pt Arial; float: left; }
            .tasks {background-color: #f0f0ff; padding: 8px;}
            .new-task {Padding-bottom: 8px;}
            .task { Padding: 4px; }
        </style>
        <script type="text/javascript" runat="server">
            Var sql = "CREATE TABLE IF NOT EXISTS tasks ( " +
                " id int (11) NOT NULL, " +
                "description varchar (255),"+
                "created datetime NOT NULL" +
                ") ENGINE=InnoDB DEFAULT CHARSET=utf8;
            Aptana.DB.execute(sql);
            Window.onserverload = function( )
            {
                var resultSet = Aptana.DB.execute("SELECT * FROM tasks ORDER BY created");
                for (var i=0; i<resultSet.rows.length; i++)
                {
```

-continued

```
                    var task = resultSet.rows[i];
                    addTask(task.description, task.id);
                }
            }
            function saveTask(id, description)
            {
                var resultSet = Aptana.DB.execute("SELECT * FROM tasks WHERE id = ?", [id]);
                if (resultSet.rows.length > 0) // task already exists
                {
                    Aptana.DB.execute("UPDATE tasks SET description = ? WHERE id = ?",
                        [description, id]);
                }
                else // insert new task
                {
                    Aptana.DB.execute("INSERT INTO tasks (id, description, created) " +
                        "VALUES (?, ?, NOW( ))",
                        [id, description]);
                }
            }
            saveTask.proxy = true;
            function $(id) { return document.getElementById(id); }
            $.runat = "both";
            function addTask(description, id)
            {
                var newId = id || Math.ceil(1000000000 * Math.random( ));
                var div = document.createElement("div");
                div.id = "task_" + newId;
                div.className = "task";
                var checkbox = document.createElement("input");
                checkbox.setAttribute("type", "checkbox");
                checkbox.setAttribute("title", "done");
                checkbox.setAttribute("id", "checkbox_" + newId);
                Aptana.setEvent(checkbox, "onclick", "completeTask(" + newId + ")");
                div.appendChild(checkbox);
                var input = document.createElement("input");
                input.setAttribute("type", "text");
                input.setAttribute("size", "60");
                input.setAttribute("title", "description");
                input.setAttribute("id", "input_" + newId);
                input.setAttribute("value", description);
                Aptana.setEvent(input, "onchange", "saveTask(" + newId + ", this.value)");
                div.appendChild(input);
                $("tasks").insertBefore(div, $("tasks").firstChild);
                if (!Aptana.isOnServer)
                {
                    saveTask(newId, description);
                }
            }
            addTask.runat = "both";
            function completeTask(taskId)
            {
                var div = $("task_" + taskId);
                div.parentNode.removeChild(div);
                deleteSavedTask(taskId);
            }
            completeTask.runat = "client";
            function deleteSavedTask(id)
            {
                Aptana.DB.execute("DELETE FROM tasks WHERE id = ?", [id]);
            }
            deleteSavedTask.proxy = true;
        </script>
    </head>
    <body>
        <h2>Tasks To Do</h2>
        <div><i>Any changes should be automatically saved to your database!</i><br/><br/></div>
        <div class="new-task">
            New:
            <input type="text" id="txt_new" size="60">
            <input type="button" value="add" onclick="addTask
                ($('txt_new').value)">
        </div>
```

```
        <div id="tasks" class="tasks">
        </div>
            </body>
        </html>
```

Processing of the code by the present invention results in the code being formatted as set forth below:

```
<html>
    <head>
        <script src="/aptana/framework.js?version=0.1.1.759"
type="text/javascript"></script>
        <script type="text/javascript">Aptana.clientData =
Aptana.Serialization.fromJSONString('{ }');</script>
        <script type="text/javascript">Aptana.Callback.id =-1407728339;
        </script>
        <title>Tasks</title>
        <style>
        body {
            font: 9pt Arial;
            float: left;
        }
        .tasks {
            background-color: #f0f0ff;
            padding: 8px;
        }
        .new-task {
            padding-bottom: 8px;
        }
        .task {
            padding: 4px;
        }
        </style>
        <script type="text/javascript">
        function $(id)
        {
            return document.getElementById(id);
        }
        function addTask(description, id)
        {
            var newId = id || Math.ceil(1000000000 * Math.random( ));
            var div = document.createElement("div");
            div.id ="task_" + newId;
            div.className = "task";
            var checkbox = document.createElement("input");
            checkbox.setAttribute("type", "checkbox");
            checkbox.setAttribute("title", "done");
            checkbox.setAttribute("id", "checkbox_" + newId);
            Aptana.setEvent(checkbox, "onclick", "completeTask
(" + newId + ")");
            div.appendChild(checkbox);
            var input = document.createElement("input");
            input.setAttribute("type", "text");
            input.setAttribute("size", "60");
            input.setAttribute("title", "description");
            input. setAttribute("id", "input_" + newId);
            input.setAttribute("value", description);
            Aptana.setEvent(input, "onchange", "saveTask(" + newId + ",
this.value)");
            div.appendChild(input);
            $("tasks").insertBefore(div, $("tasks").firstChild);
            if (!Aptana.isOnServer)
            {
                saveTask(newId, description);
            }
        }
        function completeTask(taskId)
        {
            var div = $("task_" + taskId);
            div.parentNode.removeChild(div);
            deleteSavedTask(taskId);
        }
        function saveTask( )
        {
            return Aptana.Callback.invokeFunction.call(null, "saveTask",
            arguments);
        }
        function saveTaskAsync(callback)
        {
            return Aptana.Callback.invokeFunctionAsync.call(null,
callback, "saveTask", arguments);
        }
        function deleteSavedTask( )
        {
            return Aptana.Callback.invokeFunction.call(null,
"deleteSavedTask", arguments);
        }
        function deleteSavedTaskAsync(callback)
        {
            return Aptana.Callback.invokeFunctionAsync.call(null,
callback, "deleteSavedTask", arguments);
        }
        </script>
    </head>
    <body>
        <h2>Tasks To Do</h2>
        <div>
            <i>Any changes should be automatically saved to
            your database!</i>
            <br>
            <br>
        </div>
        <div class="new-task">
            New:<input id="txt_ new" size="60" type="text">
            <input value="add" onclick="addTask($('txt_new').value)"
type="button">
        </div>
                <div id="tasks" class="tasks">
                </div>
            </body>
        </html>
```

FIG. 6 is a screen display 99 of the code set forth above.

Figure 7:
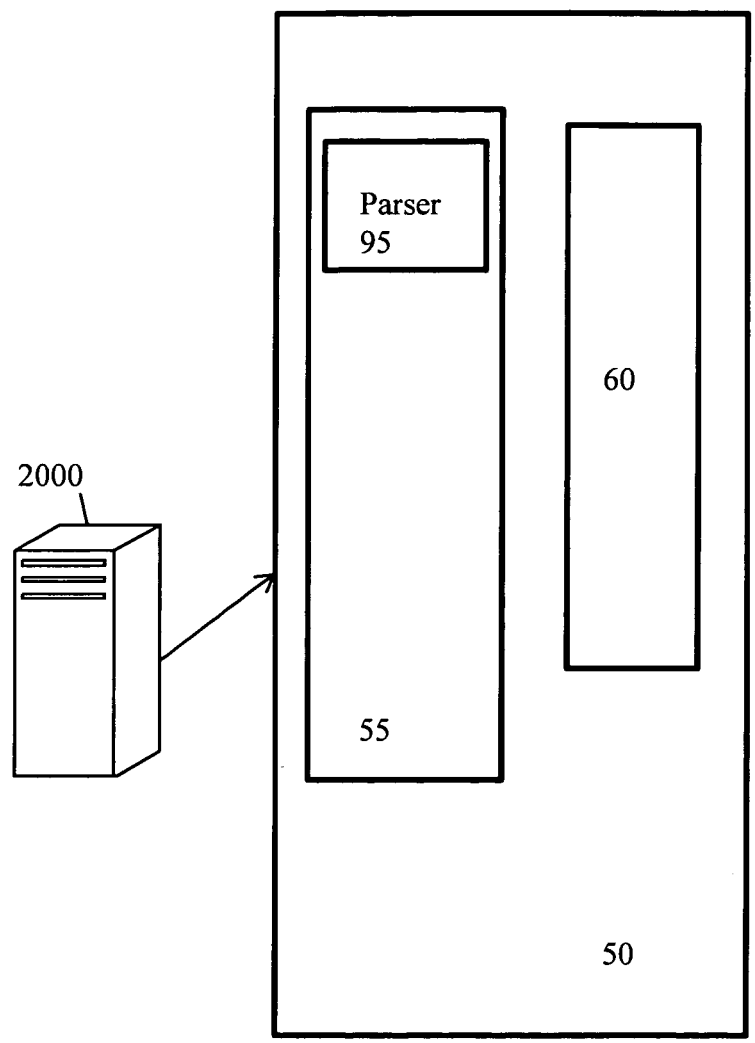
FIG. 7 is a block diagram of the server of the system of the present invention.

As shown in FIG. 7, a server-computer 2000 contains server architecture 50. The server-architecture 50 includes the server-core 55 and the server-framework 60. The server-core 55 includes a JavaScript parser 95. The server-computer 2000 is preferably a conventional server-computer available from IBM, HP, APPLE, DELL, and SUN.

Figure 7A:
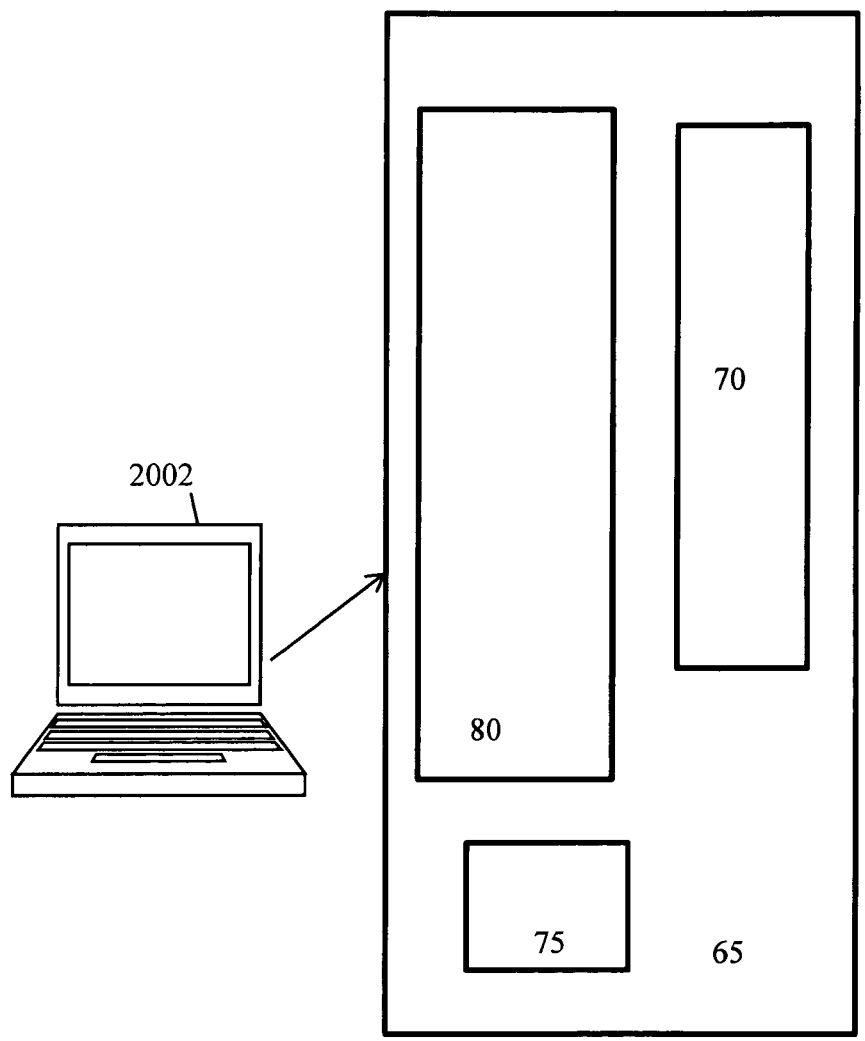
FIG. 7A is a block diagram of the user-computer of the system of the present invention.

As shown in FIG. 7A, a user-computer 2002 contains a Web-browser 65. The Web-browser 65 preferably includes the client framework 70, client-side JavaScript code 75 and the rendering engine 80. The user-computer 2002 is preferably a conventional user-computer such as a PC available from HP, DELL, and GATEWAY, or a MAC available from APPLE. The Web-browser 65 is preferably MICROSOFT INTERNET EXPLORER, NETSCAPE, APPLE SAFARI, MOZILLA FIREFOX, or OPERA.

Figure 8:
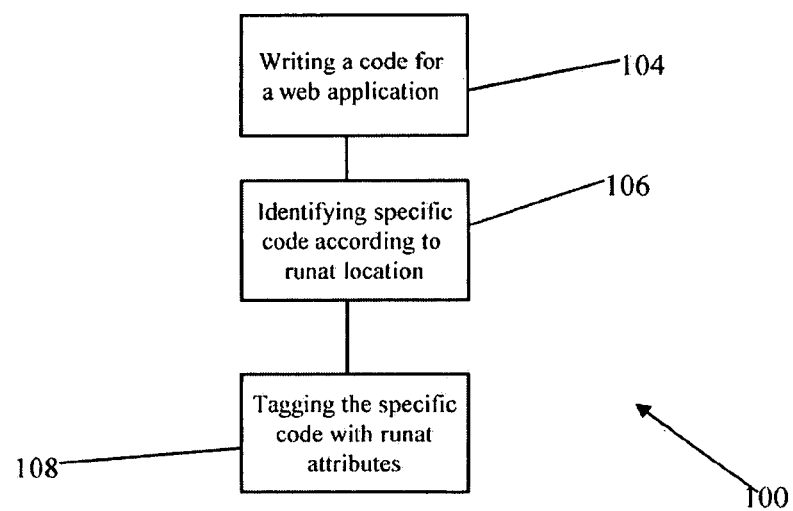
FIG. 8 is a flow chart of a general method of the present invention.
Figure 8A:
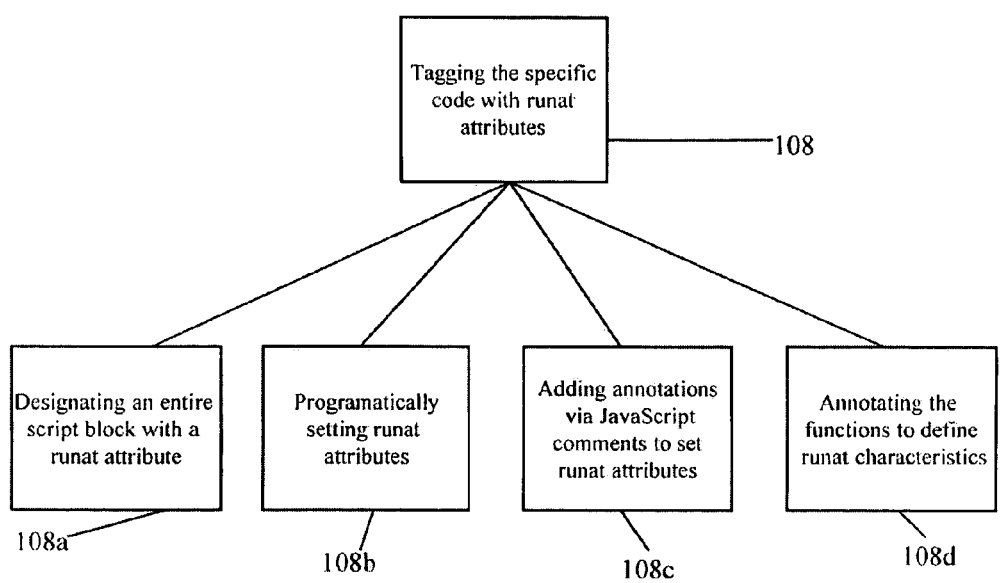
FIG. 8A is a flow chart of the components of block 108 of FIG. 8.
Figure 8B:
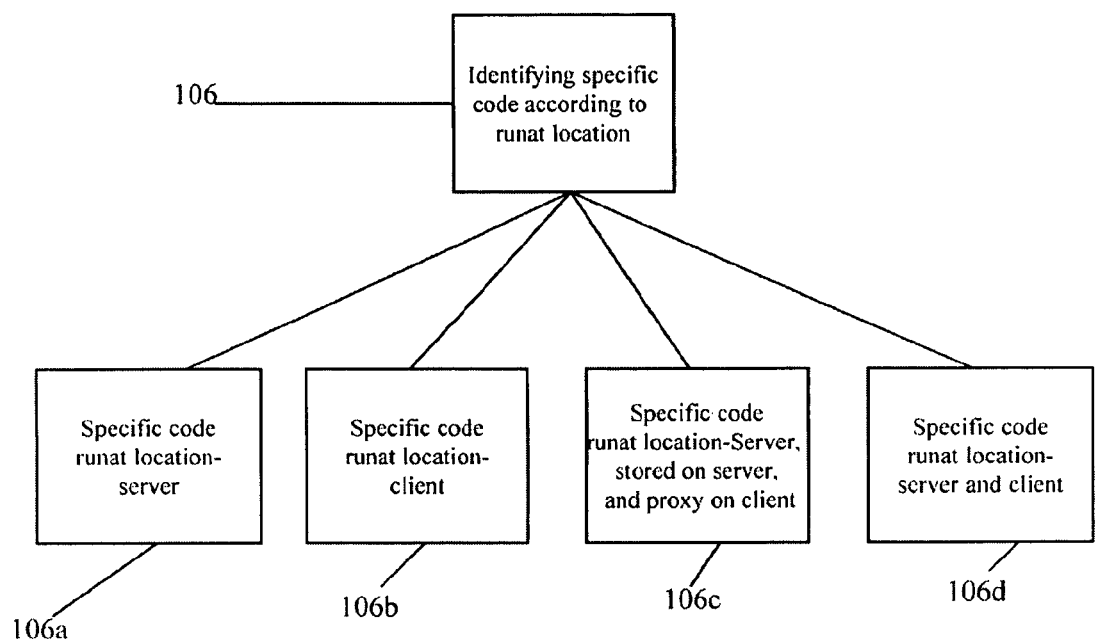
FIG. 8B is a flow chart of the components of block 106 of FIG. 8.

A general method 100 of the present invention is shown in FIG. 8. At block 104, code for a web application is written. At block 106, specific code is identified according to a runat location. At block 108, the specific code is tagged with runat attributes. FIG. 8A illustrates components of tagging the code with runat attributes. FIG. 8B illustrates components of identifying the specific code according to runat locations.

Figure 9:
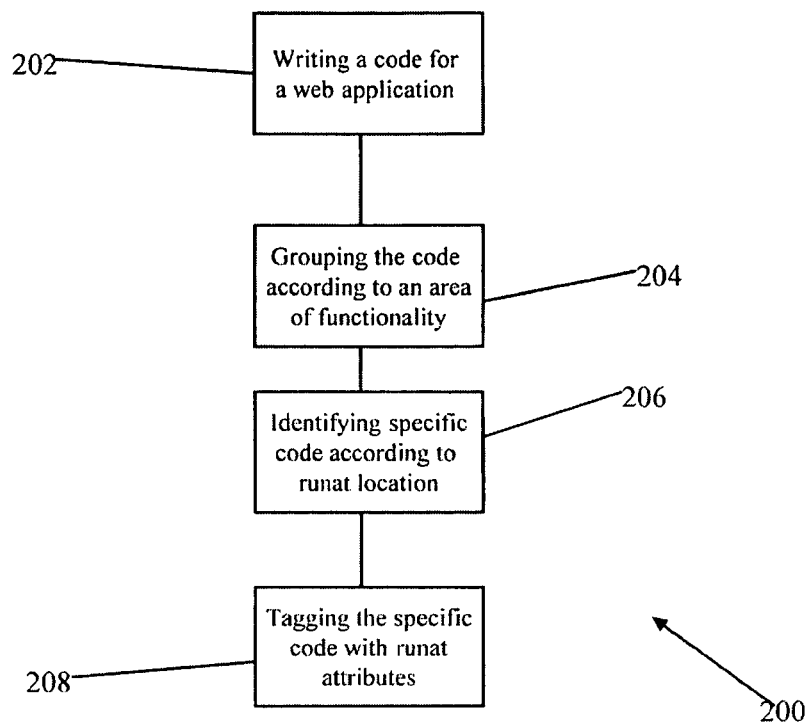
FIG. 9 is a flow chart of a specific method of the present invention.

A more specific method 200 of the present invention is shown in FIG. 9. At block 202, code for a web application is written. At block 204, the code is grouped according to an area of functionality. At block 206, specific code is identified according to a runat location. At block 208, the specific code is tagged with runat attributes. The components of FIG. 8A apply equally for the step of tagging the code with runat attributes of block 208. The components of FIG. 8B apply equally for the step of identifying the specific code according to runat locations of block 206.

Code runs on the server architecture of the present invention. To define and/or execute any code server-side, a runat attribute is added to a <script> block. The attribute has several possible values, and the values determine where the code will execute (whenever the page is served) and the other actions that will automatically occur when the code is executed. The Table One provides a description of each value for the basic attributes.

TABLE ONE

| Value | Description |
|---|---|
| Client | The functions and code contained in the script block will run in the client browser only. This functions exactly as a regular script block. This is the default value of the runat attribute, so it is usually omitted for script blocks intended for the client. Its main use is to override the runat attribute of a specific function within a server-side script block. Note: if a script block has runat = "client" (or no runat attribute), it will not run at all server-side, so one cannot override the runat behaviors of individual functions from within this block. |
| Server | The functions and code contained in the script will run on the server only. Any functions defined within the script block will be cached in association with this page. These functions are not directly callable from the client, but they can be called during callback processing by other server-side functions. These script blocks will not be presented to the client browser. |
| Both | The functions and code contained in the script will run on both the client and the server. Any functions defined within the script block will be cached in association with this page. The server-side functions are not directly callable from the client, but they can be called during callback processing by other server-side functions. |

Although most use cases are covered by the basic attributes listed in Table One, one can use the runat values listed in Table Two on <script> tags.

TABLE TWO

| Value | Description |
|---|---|
| Server-proxy | Same as the basic 'server' target except ALL the functions will be proxied by default |
| Server-nocache | Same as the basic 'server' target except NONE of the functions will be cached by default |
| Both proxy | Same as the basic 'both' target except ALL the functions will be proxied by default |
| Both nocache | Same as the basic 'both' target except NONE of the functions will be cached by default |

TABLE THREE

| Property | Description |
|---|---|
| Proxy | Server-side functions can be declared to be proxied so they are callable from the client side. This is achieved by specifying a proxy property on the function object. The possible values for this property are true or false. This is only required for enabling the proxying of the function. By default, in a <script runat="server"> block, the functions are not proxied. Note that if a function is not proxied, it isn't just that proxies are not inserted into the client to facilitate calling it: it's actually marked as not callable on the server, so hacking the client to try to call the function on the server will not work. |
| Runat | Takes the same values as the <script> tag runat attributes. |

Special function object properties are declared on the individual function objects and control how the special function object properties are managed. When these are specified the property value will override the containing script block runat setting for the individual function. This allows more granular control and prevents the need to break scripts out into separate files depending on their runat target. Table Three illustrates some of these properties.

EXAMPLE

The following example illustrates one simple way of using the runat and proxy options in a typical code scenario. Group all the server-side code in one script block, and explicitly designate a subset of function to be proxied. Then all client-side code goes in a different script block (where there isn't even the option of programmatically changing it by setting a different runat or proxy value). Of course those skilled in the pertinent art may choose different ways of organizing the code. Further, for large amounts of code, one has the option to extract the code into (reusable) external JavaScript files.

The following illustrates code for the example. The _login.js file referenced in the example contains some functions that explicitly override the runat='server' directive specified on the script tag used to load the file.

```
<script type="text/javascript" runat="server">
Function setPassword(username, newPassword)
{
    // put code in here to directly set the password of a given
       username
    //this code should not be callable from the client}
}
Function changePassword(username, oldPassword, new-
Password)
{
    // put code in here to first verify the submitted password,
    // and then—if successful—call setPassword to actually
       make changes
    // this code should be callable from the client
}
changePassword.proxy=true;
</script>
<script type="text/javascript">
Function submitPassword( )
{
    // put client-side code here to grab the username and old
       and new passwords
    // and call cahngePassword on the server}
</script>
```

In the snippet set forth the below, the function is proxied.

```
function checkCredentials (username, password)
{
    var rs=Aptana.DB.execute ("SELECT * FROM users
        WHERE username=? AND password=?",
    [username, password]);
    if (rs.rows.length==0)
    {
        return " ";
    }
    var user=rs.rows [0];
    makeAuthenticated (user);
    return user.username;
}
checkCredentials.proxy=true;
```

In the snippet set forth below, the function runs on the client-side.

```
function login( )
{
    var username=$ (username).value;
    var password=$ (password').value;
    var username=checkCredentials (username, password);
    if (username !=" ")
    (
    fromTemplate ('loginComponent', 'loginAuthenticaed');
    setTimeout              ("$("authenticatedUsername")
        .innerHTML='"+username+" ", 0);
```

```
        changeAuthentication (true);
    else
    {
        $ ('loginMessage").innerHTML="Sorry, try again";
    }
}
login.runat="client";
```

The following is an illustration of object inside an Aptana namespace to allow the proxy functions to be declared in a single group within JavaScript code.

```
Aptana.proxies=(myFunc1, myFunc2, "myFunction"};
// ...
Aptana.proxies=Aptana.proxies .psuh{myFunc3, "myFunction4"};
```

This code is presented in such a way that it is executed by the server prior to DOM serialization. One can also use this code to remove the proxied functions by setting the value to null. Also, Aptana.proxies is not a complete collection of the functions being proxied by the server it is just a convenient way to express the myFunc.proxy=true; syntax for multiple function references.

The runat attribute applies to everything within the <script> block. Individual functions within the <script> block are changed to a different runat value by adding a runat/proxy property to them and setting it to the appropriate (string) value: for example, myFunction.runat="both". The one exception is for <script> blocks that don't have a runat attribute (or have runat="client"): since such <script> blocks are not executed at all on the server, setting runat properties within those <script> blocks will not take place on the server, so the behavior of functions within them cannot be changed from within them.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for tagging to code to determine a run location, the method comprising:
    writing a code for a Web application;
    grouping the code according to an area of functionality;
    identifying a plurality of sections of the code having one or more functions required to be run on either or both of a client and a server; and
    tagging each of the plurality of sections of the code with a runat attribute that denotes whether a respective section of code will run on either or both of the client and the server when the code is executed, wherein the tagging comprises add the runat attribute to each of the identified plurality of sections of the code, and wherein a runat attribute specifying functions running on the client only will not run on the server, a runat attribute specifying functions running on the server only are not directly callable by the client but can be called by the client during callback processing by other server functions, and a runat attribute specifying functions running on both the client and server will run on both the client and server;
    automatically stripping functions from data sent to the client if the runat attribute specifies the functions run on the server only;
    wherein a plurality of script blocks are contained in a single file, and the runat attribute for each script block may be modified by a special function object property that overrides a runat attribute section for a function to prevent the need to separate script blocks into separate files to facilitate different runat targets within the single file.

2. The method according to claim 1 wherein tagging each of the plurality of sections of the code with the runat attribute comprises programatically setting runat attributes on the code.

3. The method according to claim 1 wherein tagging each of the plurality of sections of the code with the runat attribute comprises adding annotations via JavaScript comments.

4. The method according to claim 1 wherein tagging each of the plurality of sections of the code with the runat attribute comprises using JavaScript language to annotate the area of functionality to define a runat attribute for each of the plurality of sections of the code.

5. The method according to claim 1 wherein a function specified to run only on the server can be declared to be callable by the client by enabling proxying of the function.

6. The method according to claim 5 wherein if the runat attribute is set to server only and proxying is not enabled, the function is marked as not callable on the server to prevent the possibility of hacking the client to call the function on the server.

7. The method according to claim 1 wherein the runat location is stored on the server and having a proxy on the client.

8. A system for tagging to code to determine a run location, the system comprising:
    a server comprising a memory and a processor;
    a client;
    a code written in a scripting language, the code having a plurality of sections each having one or more functions required to be run on either or both of a client and a server;
    a tag for each of the plurality of sections of the code with a runat attribute that denotes whether a respective section of code will run on either or both of the client and the server when the code is executed, and wherein a runat attribute specifying functions running on the client only will not run on the server, a runat attribute specifying functions running on the server only are not directly callable by the client but can be called by the client during callback processing by other server functions, and a runat attribute specifying functions running on both the client and server will run on both the client and server;
    and further wherein the server is configured to strip each of the identified plurality of sections of code;
    wherein functions are automatically stripped from data sent to the client if the runat attribute specifies the functions run on the server only and a plurality of script blocks are contained in a single file, and the runat attribute for each script block may be modified by a special function object property that overrides a runat attribute section for a function to prevent the need to separate script blocks into separate files to facilitate different runat targets within the single file.

9. The system according to claim 8 wherein a function specified to run only on the server can be declared to be callable by the client by enabling proxying of the function.

10. The system according to claim 8 wherein the tag comprises an action designating an entire script block with the runat attribute.

11. The system according to claim 8 wherein the tag comprises an action programatically setting runat attributes on the code.

12. The system according to claim 8 wherein the tag comprises an action adding annotations via JavaScript comments.

13. The system according to claim 8 wherein the tag comprises an action using JavaScript language to annotate the area of functionality to define the runat attribute for each of the plurality of sections of the code.

14. A computer program product for creating a Web application embodied on a non-transitory computer storage readable medium, the computer program product, when executed by a server-computer, causing the server-computer to carry out the steps of:

receiving code written in a scripting language;

identifying a plurality of sections of the code having one or more functions required to be run on either or both of a client and a server; and tagging each of the plurality of sections of the code with a runat attribute that denotes whether a respective section of code will run on either or both of the client and the server when the code is executed, wherein the tagging comprises add the runat attribute to each of the identified plurality of sections of the code, and wherein a runat attribute specifying functions running on the client only will not run on the server, a runat attribute specifying functions running on the server only are not directly callable by the client but can be called by the client during callback processing by other server functions, and a runat attribute specifying functions running on both the client and server will run on both the client and server;

automatically stripping functions from data sent to the client if the runat attribute specifies the functions run on the server only;

wherein a plurality of script blocks are contained in a single file and the runat attribute for each script block may be modified by a special function object property that overrides a runat attribute section for a function to prevent the need to separate script blocks into separate files to facilitate different runat targets within the single file.

15. The computer program product according to claim 14 wherein the runat location is stored on the server and having a proxy on the client.

16. The computer program product according to claim 14 further comprising automatically stripping functions from data sent to the client if the runat attribute specifies the functions run on the server only.

17. The computer program product according to claim 14 further comprising programatically setting runat attributes on the code.

18. The computer program product according to claim 14 further comprising adding annotations via JavaScript comments.

* * * * *